Oct. 17, 1961     J. G. BUNTING ET AL     3,004,739
GASOLINE TANK
Filed Aug. 27, 1959
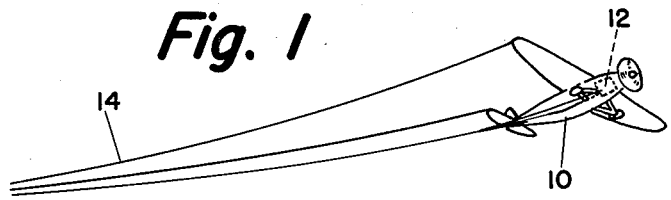
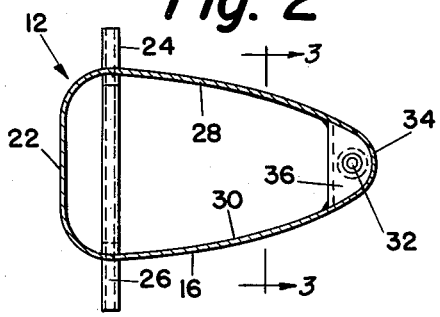
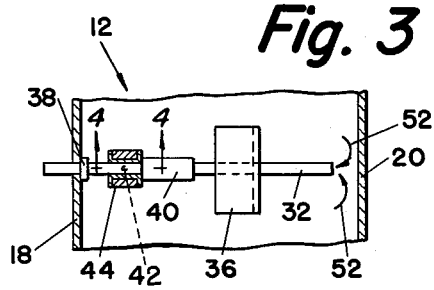
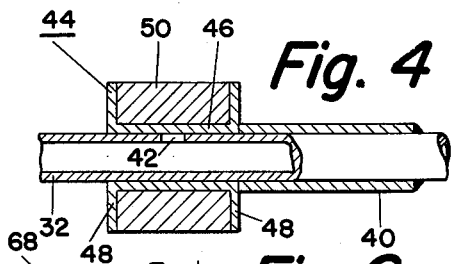
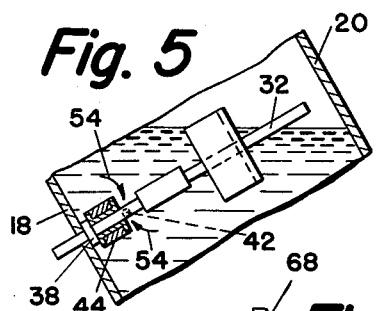
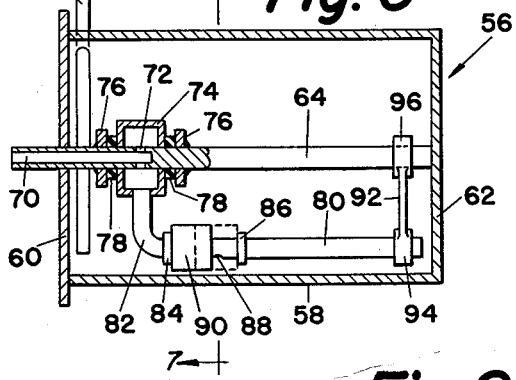
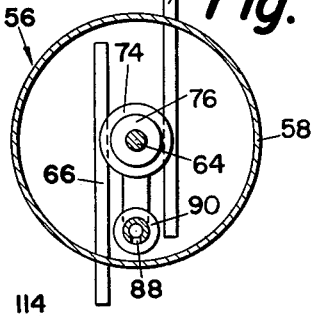
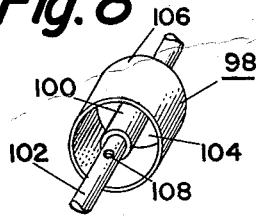
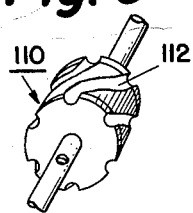
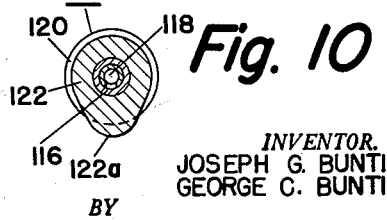
INVENTOR.
JOSEPH G. BUNTING
GEORGE C. BUNTING
BY
Arthur H. Seidel
ATTORNEY United States Patent Office 3,004,739
Patented Oct. 17, 1961

3,004,739
GASOLINE TANK
Joseph G. Bunting, 2504 Jackson St., Apt. 7A, and George C. Bunting, 3223 S. 22nd St., both of Philadelphia, Pa.
Filed Aug. 27, 1959, Ser. No. 836,404
13 Claims. (Cl. 244—135)

The present invention relates to a gasoline tank, and more particularly to a gasoline tank for power driven aircraft, such as airplanes, missiles, and model airplanes.

A problem with gasoline powered aircraft, particularly model airplanes, is to maintain a continuous flow of gasoline to the engine during the entire flight of the aircraft no matter what position the aircraft is in. In the gasoline tanks heretofore used for model airplanes, the outlet pipe of the gasoline tank is arranged so that when the airplane is flying level, or is climbing, the open end of the outlet pipe is within the gasoline to provide a flow of the gasoline to the engine. However, when the airplane is diving, the gasoline within the tank flows away from the open end of the outlet pipe so that the flow of the gasoline to the engine is interrupted and the engine stops.

In the flying of radio controlled model airplanes, the problem of maintaining a continuous flow of gasoline from the tank to the engine is even greater. When flying a radio controlled model airplane, it is desirable to put the airplane through all types of stunts. Thus, the gasoline in the tank not only flows away from the open end of the outlet pipe when the airplane is put in a dive, but also when the airplane is put through a loop or is flying upside down. When the flow of the gasoline to the engine is interrupted, the engine will stop, and may not restart even if the flow of gasoline to the engine is quickly restarted. If the engine stops, the plane may crash causing considerable damage to the plane and the instruments carried by the plane.

It is an object of the present invention to provide a novel gasoline tank.

It is another object of the present invention to provide a novel gasoline tank for power driven aircraft.

It is a further object of the present invention to provide a gasoline tank for model airplanes which provides a continuous flow of the gasoline in all positions of the airplane.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a perspective view of a gasoline powered model airplane which is controlled by a tether.

FIGURE 2 is a transverse sectional view of the gasoline tank of the present invention.

FIGURE 3 is a sectional view taken along line 3—3 of FIGURE 2.

FIGURE 4 is a sectional view taken along line 4—4 of FIGURE 3.

FIGURE 5 is a view similar to FIGURE 3 showing the position of the gasoline tank when the airplane is diving.

FIGURE 6 is a sectional view of a modification of the gasoline tank of the present invention.

FIGURE 7 is a sectional view taken along line 7—7 of FIGURE 6.

FIGURE 8 is a perspective view of a modification of the valve member of the gas tanks of the present invention.

FIGURE 9 is a perspective view of still another modification of the valve member of the gas tanks of the present invention.

FIGURE 10 is a sectional view of a further modification of the valve member of the gas tanks of the present invention.

Referring initially to FIGURE 1, there is shown a gasoline powered model airplane, generally designated as 10, having a gas tank 12 of the present invention for feeding gasoline to the engine of the airplane 10. Airplane 10 is controlled by tether wires, generally designated as 14, which extend from one side of the airplane 10. The free ends of the tether wires 14 are held by the person flying the airplane 10. The airplane 10 is flown in a large circle around the person with the tether wires 14 controlling whether the airplane 10 flies on a level, dives, climbs, or performs precision acrobatics.

Referring to FIGURES 2 and 3, the gasoline tank 12 of the present invention comprises an outer wall 16 which is substantially triangular in transverse cross-section, and a pair of flat end walls 18 and 20 secured across the ends of the outer wall 16. The gasoline tank 12 is positioned so that the base 22 of the outer wall 16 is substantially vertical. A pair of air vent tubes 24 and 26 extend vertically into the gasoline tank 12 adjacent the base 22. Air vent tube 24 extends downwardly through the top side 28 of the outer wall 16, and extends to a point just above the bottom side 30 of the outer wall 16. Air vent tube 26 extends upwardly through the bottom side 30 of the outer wall 16, and extends to a point just below the top side 28 of the outer wall 16. Thus, when the gasoline tank 12 contains gasoline, at least one of the air vent tubes 24 and 26 will be open to the atmosphere during all positions of the gas tank 12 without permitting the escape of any of the gasoline.

An outlet pipe 32 is disposed within the gasoline tank 12 and extends along the apex 34 of the outer wall 16. The front end of the outlet pipe 32 extends through and is supported by the front end wall 18 of the gas tank 12, and the back end of the outlet pipe 32 extends to a point just short of the back end wall 20 of the gas tank 12. Outlet pipe 32 extends through a bracket 36 which is secured across the inner surface of the apex 34 of the outer wall 16. Bracket 36 supports the back end of the outlet pipe 32. Outlet pipe 32 has an annular flange 38 adjacent its front end, which flange 38 abuts against the inner surface of the front end wall 18 of the gasoline tank 12. A collar 40 is secured around the outlet pipe 32 adjacent to but spaced from the annular flange 38. Outlet pipe 32 has a hole 42 therethrough between the collar 40 and the flange 38, but closer to the collar 40 than the flange 38.

A valve member 44 is slidably disposed around the outlet pipe 32 between the collar 40 and the flange 38. Valve member 44 comprises a sleeve 46 of a bearing material, such as brass, having a separate annular flange 48 extending radially outwardly from each end of the sleeve 46. A ring 50 of a heavy metal, such as lead, is secured around the sleeve 46 and between the flanges 48. The valve member 44 is a length so that when the valve member 44 abuts against the collar 40, the valve member 44 will cover the hole 42 in the outlet pipe 32. However, when the valve member 44 slides into engagement with the flange 38, the hole 42 in the outlet pipe 32 will be uncovered.

The gasoline tank 12 of the present invention is mounted in the body of the airplane 10 with the base 22 of the outer wall 16 being adjacent the side of the body of the airplane 10 to which the tether wires 14 are connected, and with the top and bottom sides 28 and 30 of the outer wall 16 extending along the top and bottom sides of the body of the airplane 10. The front end wall 18 of the gasoline tank 12 will face the engine of the airplane 10, and the front end of the outlet pipe 32 which projects through the front end 18 of the gasoline tank 12 is connected to the engine of the airplane.

During the flight of the airplane 10, the gasoline tank 12 of the present invention operates as follows:

Since the tethered airplane 10 is continuously flying in a circle, centrifugal force throws the gasoline within the gasoline tank 12 into the apex 34 of the outer wall 16 to maintain the outlet pipe 32 immersed in the gasoline. As long as the airplane 10 is flying on a level, the back end of the outlet pipe 32 is immersed in the gasoline so that the gasoline is drawn into the outlet pipe 32 as indicated by the arrows 52 in FIGURE 3. When the airplane 10 climbs, the gasoline will flow toward the back end wall 20 of the gasoline tank 12 to maintain the back end of the outlet pipe 32 immersed in the gasoline. While the airplane 10 is flying on a level or is climbing, the valve member 44 is seated against the collar 40 and closes the hole 42 in the outlet pipe 32.

However, when the airplane 10 is diving, the gasoline in the gasoline tank 12 flows forward against the front end wall 18 of the gasoline tank 12 as shown in FIGURE 5. Thus, the back end of the outlet pipe 32 is removed from the gasoline so that the gasoline cannot be drawn into the back end of the outlet pipe 32. However, when the gasoline tank 12 is tilted downwardly, the valve member 44, which is freely slidable on the outlet pipe 32, slides forward against the annular flange 38 to open the hole 42 in the outlet pipe 32. The hole 42 being adjacent the front end of the outlet pipe 32 is immersed in the gasoline, so that the gasoline is drawn into the outlet pipe 32 through the hole 42 as indicated by the arrows 54 in FIGURE 5. Thus, the gasoline tank 12 of the present invention provides a continuous flow of the gasoline from the gasoline tank 12 when the airplane 10 is driving as well as when the airplane 10 is flying on a level or is climbing.

Referring to FIGURES 6 and 7, a modification of the gasoline tank of the present invention is generally designated as 56. Gasoline tank 56 comprises a cylindrical outer wall 58, and flat front and back end walls 60 and 62. A rod 64 extends longitudinally through the center of the outer wall 58. The back end of the rod 64 is supported on the back end wall 62, and the front end of the rod 64 extends through and is supported by the front end wall 60. A pair of vent tubes 66 and 68 extend transversely across the gasoline tank 56 adjacent the front end wall 60. Vent tubes 66 and 68 extend along opposite sides of the rod 64, and project through substantially diametrically opposite sides of the outer wall 58.

Rod 64 has a passageway 70 extending longitudinally therethrough from the front end thereof to a point just within the gasoline tank 56. A plurality of holes 72 extend radially through the rod 64 to the inner end of the passageway 70. A hollow, cylindrical manifold 74 is rotatably disposed around the rod 64, and covering the holes 72. Annular stop flanges 76 are secured around the rod 64 adjacent opposite ends of the manifold 74. A seal 78 is provided between each stop collar 76 and the manifold 74 to prevent leakage of gasoline from the manifold 74.

An outlet pipe 80 is within the gasoline tank 56, and extends parallel to and spaced from the rod 64. The front end 82 of the outlet pipe 80 is bent substantially perpendicular to the outlet pipe 80, and extends through and is secured to the outer wall of the manifold 74. Outlet pipe 80 has a pair of longitudinally spaced flanges 84 and 86 therearound adjacent to the front end 82. A hole 88 extends through the outlet pipe 80 between the flanges 84 and 86, but closer to the back flange 86. Hole 88 extends through the portion of the outlet pipe 80 which faces the outer wall 58 of the gasoline tank 56. A valve member 90 is slidably disposed around the outlet pipe 80 between the flanges 84 and 86. Valve member 90 is identical in construction to the valve member 44 of the gasoline tank 12 shown in FIGURES 2 and 3. A brace 92 extends radially between the back end of the outlet pipe 80 and the rod 64, and supports the back end of the outlet pipe 80 from the rod 64. Brace 92 has a collar 94 at its outer end through which the outlet pipe 80 extends. Brace 92 has a collar 96 at its inner end which is rotatably disposed around the rod 64. Thus, the outlet pipe 80 is rotatably supported from the rod 64 at its front end by the manifold 74 and at its back end by the brace 92.

The gasoline tank 56 of the present invention may be used in any type of power driven aircraft, and for use in gasoline propelled model airplanes it has particular utility in a radio controlled model airplane. In the flight of a radio controlled model airplane, the gasoline tank 56 of the present invention operates as follows:

The gasoline tank 56 is mounted in the body of the airplane with the rod 64 extending parallel to the longitudinal axis of the airplane and with the front end wall 60 facing the engine of the airplane. When the airplane is flying on a level, the outlet pipe 80 will be positioned in the bottom of the gasoline tank 56, and will be immersed within the gasoline within the tank 56. The valve member 90 will be seated against the back flange 86, as indicated by the dotted lines, and will cover the hole 88 so that the gasoline will be drawn into the outlet pipe 80 through the back end thereof. The gasoline entering the outlet pipe 80 passes into the manifold 74, through the holes 72, and through the passageway 70 in the rod 64 to a pipe connecting the gasoline tank 56 to the airplane engine. If the airplane climbs, the gasoline will flow to the back end wall 62, and the back end of the outlet pipe 80 will remain immersed in the gasoline.

If the airplane dives, the gasoline will flow to the front end wall 60 of the tank 56 so that the back end of the outlet pipe 80 will be out of the gasoline. However, the valve member 90, which is freely slidable on the outlet pipe 80, will slide forwardly against the flange 84 and uncover the hole 88. Since the hole 88 is adjacent the front end of the gasoline tank 56, the hole 88 will be immersed in the gasoline so that the gasoline will be drawn into the outlet pipe 80 through the hole 88.

If the airplane banks sharply to either side, or is put through a loop so as to turn upside down, the gasoline will tend to flow away from the outlet pipe 80 so that both the back end of the outlet pipe 80 and the hole 88 would not be immersed in the gasoline. However, since the outlet pipe 80 is mounted on the rod 64 for rotation around the rod 64, the outlet pipe 80 will follow the flow of the gasoline to remain immersed in the gasoline. Thus, the gasoline tank 56 of the present invention will provide a continuous flow of gasoline to the engine of the airplane in all positions of the flight of the airplane.

Referring to FIGURE 8, a modification of the valve member for use in either the gasoline tank 12 or the gasoline tank 56 of the present invention is generally designated as 98.

Valve member 98 comprises a sleeve 100 slidably disposed around an outlet pipe 102 of a gasoline tank of the present invention. Sleeve 100 has an annular flange 104 extending radially outwardly from the front end of the sleeve 100. A cylindrical collar 106 extends rearwardly from the outer periphery of the flange 104 so that the collar 106 is concentric with and spaced radially from the sleeve 100. The valve member 98 is positioned on the outlet pipe 102 so that the space between the sleeve 100 and the collar 106 faces toward the front end of the gasoline tank. Thus, when the airplane dives, and the gasoline within the tank flows toward the front end of the tank, the gasoline will fill the space between the sleeve 100 and the collar 106 of the valve member 98, and help slide the valve member 98 along the outlet pipe 102 to expose the hole 108 in the outlet pipe 102. Thus, the valve member 98 utilizes the weight and movement of the gasoline within the tank to help slide the valve member 98 along the outlet pipe 102.

Referring to FIGURE 9, another modification of the valve member is generally designated as 110. Valve member 110 is identical in construction to the valve member 44 shown in FIGURE 4, except that it is provided with a plurality of helically extending grooves 112 circumferentially spaced around its outer surface. In the use of the valve member 110, when the gasoline in the gasoline tank of the present invention flows across the valve member 110, the gasoline flows through the helical grooves 112. The flow of the gasoline through the grooves 112 causes the valve member 110 to rotate slightly around the outlet pipe. The slight rotation of the valve member 110 around the outlet pipe prevents the valve member 110 from sticking to the outlet pipe so that the valve member 110 is always free to slide along the outlet pipe. In place of the helical grooves 112, the valve member 110 can be provided with helically extending ribs projecting from the outer surface thereof to accomplish the same results.

Referring to FIGURE 10, a still further modification of the valve member is generally designated as 114. Valve member 114 comprises a sleeve 116 which is slidably disposed around the outlet pipe 118. Sleeve 116 has an annular flange 120 extending radially from each end of the sleeve 116. An annular body 122 of a heavy material, such as lead is secured around the sleeve 116 and between the flanges 120. The annular body 122 has a portion 122a which extends beyond the outer periphery of the flanges 120. The offset portion 122a of the body 122 moves the center of gravity of the valve member 114 into the offset portion 122a. Thus, the offset portion 122a will always hang downwardly. In the use of the valve member 114, when the airplane moves from side to side, thereby swinging the outlet pipe 118, the valve member 114 will rotate on the outlet pipe 118 due to the offset portion 122a of the annular body 122. The rotation of the valve member 114 around the outlet pipe 118 prevents sticking between the valve member 114 and the outlet pipe 118 so that the valve member 114 will always be free to slide along the outlet pipe 118.

The present invention may be embodied in other specific forms without departing from the spirit or essential attributes thereof and, accordingly, reference should be made to the appended claims, rather than to the foregoing specification as indicating the scope of the invention.

We claim:

1. A gasoline tank for aircraft comprising a triangular shaped container for the gasoline, an outlet pipe disposed within said container along the apex thereof, one end of said outlet pipe being open into said container and the other end of said outlet pipe being in communication with the outside of said container, a radially extending hole through said outlet pipe spaced from the one end of said outlet pipe, an annular gravity responsive valve member slidably disposed around said outlet pipe, said valve member being slidable longitudinally along said outlet pipe between a first position in which the valve member covers said hole and a second position in which the hole is uncovered, said valve member being in said first position when said outlet pipe is angled with said hole being higher than said one end of said outlet pipe, said valve member being in said second position when said outlet pipe is angled with said hole being lower than said one end of said outlet pipe, and means on said outlet pipe limiting the movement of said valve member between said first and second positions.

2. A gasoline tank in accordance with claim 1 including a pair of vent tubes extending through opposite sides of said container, each of said vent tubes extending across said container to the side opposite the side through which the vent tube entered the container.

3. A gasoline tank in accordance with claim 2 in which the valve member has a plurality of helically extending grooves spaced circumferentially around its outer surface.

4. A gasoline tank in accordance with claim 2 in which the valve member is a sleeve, a separate annular flange extending radially outwardly from each end of said sleeve, a ring of heavy metal secured around said sleeve and between said flanges, and a portion of said ring extending beyond the outer periphery of the flanges of the valve member so that the center of gravity of said valve member is offset from the longitudinal axis of the valve member.

5. A gasoline tank in accordance with claim 1 in which the valve member comprises a sleeve slidably disposed around the outlet pipe, an annular flange extending radially from one end of said sleeve, and a cylindrical collar extending from the outer periphery of said flange back around said sleeve, said collar being concentric with but spaced from said sleeve.

6. A gasoline tank for aircraft comprising a container having an enclosed outer wall and end walls secured across the ends of the outer wall, an outlet pipe disposed within said container, said outlet pipe extending from adjacent one end wall along said outer wall and projecting through the other end wall, the outer wall of said container being substantially triangular in transverse cross section, said outlet pipe extending along the apex of said outer wall, said outlet pipe having a radially extending hole therethrough adjacent the other end wall of said container, an annular valve member slidably disposed around said outlet pipe, said valve member being slidable longitudinally along said outlet pipe between a first position in which the valve member covers said hole and a second position in which the hole is uncovered, said valve member being gravity biased to said first and second positions by tilting of said container in opposite directions, and means on said outlet pipe limiting the movement of said valve member between said first and second positions.

7. A gasoline tank in accordance with claim 6 in which the means for limiting the movement of said valve member comprises a pair of annular flanges secured around said outlet pipe on opposite sides of the hole.

8. A gas tank in accordance with claim 7 including a bracket secured to said outer wall and supporting the inner end of the outlet pipe.

9. A gas tank in accordance with claim 8 including a pair of vent tubes extending into said container from opposite sides of said outer wall adjacent to and substantially parallel to the base of said outer wall, each of said vent tubes extending across said container.

10. A gasoline tank for aircraft comprising a container having a cylindrical outer wall and end walls extending across the ends of the cylindrical wall, a rod extending longitudinally through the center of said container, one end of said rod being supported on one of the end walls and the other end of said rod projecting through and supported by the other end wall, said rod having a passageway extending longitudinally therethrough from the other end to a point within the container, said rod having a plurality of radially extending holes therethrough adjacent the other end wall and opening into said passageway, a hollow cylindrical manifold rotatably disposed around said rod and covering the holes in said rod, an outlet pipe within said casing and extending parallel to but spaced from said rod, one end of said outlet pipe being bent and extending into said manifold, the free end of said outlet pipe being in communication with the interior of said container, said outlet pipe having a radially extending hole therethrough adjacent the bent end thereof, an annular valve member slidably disposed around said outlet pipe, said valve member being slidable longitudinally along said outlet pipe between a first position in which valve member covers said outlet pipe hole and a second position in which the outlet pipe hole is uncovered, said valve member being gravity biased to said first and second positions by tilting of said container in opposite directions, and a pair of flanges around said outlet pipe on opposite sides of said valve member to limit the movement of said valve member between said first and second positions.

11. A gasoline tank in accordance with claim 12 including a brace extending radially between said rod and the free end of the outlet pipe, the outer end of said brace being secured to said outlet pipe, and the inner end of said brace being rotatably supported on said rod, whereby said outlet pipe is gravity responsive thereby constantly assuming a position below said rod.

12. A gasoline tank in accordance with claim 11 including a pair of flanges on the rod on opposite sides of the manifold to prevent longitudinal movement of said manifold along said rod, and sealing means between each side of said manifold and said rod.

13. A gasoline tank in accordance with claim 12 including a pair of vent tubes extending into said container adjacent the other end wall and from substantially diametrically opposite sides of said outer wall, each of said vent tubes extending across said container.

References Cited in the file of this patent

UNITED STATES PATENTS

| | | | |
|---|---|---|---|
| 799,454 | Cordner | Sept. 12, | 1905 |
| 2,245,198 | Hunter et al. | June 10, | 1941 |
| 2,352,898 | Hill | July 4, | 1944 |
| 2,399,323 | Chester | Apr. 30, | 1946 |
| 2,404,765 | Valentyne | July 23, | 1946 |
| 2,662,538 | Cervino | Dec. 15, | 1953 |
| 2,884,937 | Myers | May 5, | 1959 |